(12) United States Patent
Pu et al.

(10) Patent No.: US 10,973,053 B2
(45) Date of Patent: Apr. 6, 2021

(54) LISTEN-BEFORE-TALK PROCEDURE WITH PRIORITY AND INTERFERENCE ADDITION AWARENESS

(71) Applicant: Apple Inc., Cupertino, CA (US)

(72) Inventors: Tianyan Pu, Cupertino, CA (US); Wei Zhang, Santa Clara, CA (US); Wei Zeng, San Diego, CA (US); Haitong Sun, Irvine, CA (US); Ping Wang, San Jose, CA (US); Dawei Zhang, Saratoga, CA (US); Sami M. Almalfouh, San Jose, CA (US); Johnson O. Sebeni, Fremont, CA (US); Li Su, San Jose, CA (US)

(73) Assignee: Apple Inc., Cupertino, CA (US)

( * ) Notice: Subject to any disclaimer, the term of this patent is extended or adjusted under 35 U.S.C. 154(b) by 33 days.

(21) Appl. No.: 16/373,910

(22) Filed: Apr. 3, 2019

(65) Prior Publication Data

US 2019/0313454 A1    Oct. 10, 2019

Related U.S. Application Data

(60) Provisional application No. 62/653,408, filed on Apr. 5, 2018.

(51) Int. Cl.
*H04W 74/08* (2009.01)
*H04W 72/04* (2009.01)
(Continued)

(52) U.S. Cl.
CPC ....... *H04W 74/0816* (2013.01); *H04W 28/20* (2013.01); *H04W 48/16* (2013.01);
(Continued)

(58) Field of Classification Search
CPC ......... H04W 74/0816; H04W 74/0808; H04W 24/02; H04W 28/20; H04W 48/16;
(Continued)

(56) References Cited

U.S. PATENT DOCUMENTS

2016/0278088 A1* 9/2016 Cheng .................. H04W 28/18
2016/0309511 A1* 10/2016 Li ...................... H04W 74/0816
(Continued)

OTHER PUBLICATIONS

Vivo; "Potential solutions and techniques for NR unlicensed spectrum"; R1-1801557; Partnership Project (3GPP), Mobile Competence Centre, 650 Route Des Lucioles, F-06921 Sophia-Antipolis Cedex; France; vol. RAN WG1, no. Athens, Greece; Feb. 5, 2018; six pages.
(Continued)

*Primary Examiner* — Wutchung Chu
(74) *Attorney, Agent, or Firm* — Kowert, Hood, Munyon, Rankin & Goetzel, P.C.

(57) ABSTRACT

An enhanced listen-before-talk procedure may be performed by a device for efficiently accessing and utilizing available resources. The procedure may include specifying input parameter values pertaining to intended wireless communications of the device, adjusting output parameter values based on the input parameter values and an access history of the device, and determining whether to access at least a portion of the wireless communication resources to conduct the wireless communications, based at least on the output parameter values. The output parameter values may pertain to wireless communication resources accessible to the device, and the access history may keep track of wireless communication resource accesses previously made by the device. Input parameter values may include requested channel occupation time, requested frequency resource, requested transmission power, and/or priority and/or urgency of requested transmission, while output parameter
(Continued)

US 10,973,053 B2

Page 2 values may include energy detection threshold, contention window size, and/or extended clear channel assessment bypass.

20 Claims, 8 Drawing Sheets

(51) Int. Cl.
    *H04W 72/10* (2009.01)
    *H04W 28/20* (2009.01)
    *H04W 72/12* (2009.01)
    *H04W 48/16* (2009.01)
    *H04W 76/28* (2018.01)

(52) U.S. Cl.
    CPC ....... *H04W 72/0446* (2013.01); *H04W 72/10* (2013.01); *H04W 72/1247* (2013.01); *H04W 76/28* (2018.02)

(58) Field of Classification Search
    CPC ............. H04W 72/0446; H04W 72/10; H04W 72/1247; H04W 28/18; H04W 76/28; H04W 76/38; H04W 74/085
    See application file for complete search history.

(56) References Cited

U.S. PATENT DOCUMENTS

| | | | | |
|---|---|---|---|---|
| 2016/0309512 A1* | 10/2016 | Li | ............... | H04W 74/0816 |
| 2017/0171887 A1* | 6/2017 | Shi | ............... | H04W 74/0816 |
| 2017/0231003 A1 | 8/2017 | Godana | | |
| 2018/0020485 A1* | 1/2018 | Yang | ............... | H04W 74/008 |
| 2018/0084555 A1 | 3/2018 | Mori | | |
| 2018/0205526 A1* | 7/2018 | Kim | ............... | H04L 5/00 |
| 2018/0235005 A1* | 8/2018 | Ansari | ............... | H04W 74/0808 |
| 2018/0255576 A1* | 9/2018 | Bhorkar | ............... | H04L 5/001 |
| 2018/0263048 A1* | 9/2018 | Ingale | ............... | H04W 72/1215 |
| 2018/0352579 A1* | 12/2018 | Agardh | ............... | H04L 25/0206 |
| 2018/0368099 A1* | 12/2018 | Chen | ............... | H04W 48/18 |
| 2019/0274162 A1* | 9/2019 | Zhang | ............... | H04W 74/08 |
| 2019/0364492 A1* | 11/2019 | Azizi | ............... | H04W 52/0264 |
| 2019/0387534 A1* | 12/2019 | Geraci | ............... | H04B 7/0452 |
| 2020/0383089 A1* | 12/2020 | Goto | ............... | H04L 1/1812 |

OTHER PUBLICATIONS

Orfanos et al; "Development and Performance Evaluation of an Adaptive MAC Protocol for MC-CDMA Wireless LANs with QoS Support"; Jun. 19, 2006; pp. 43-70.
International Search Report and Written Opinion, Patent Application No. PCT/US2019/025850, dated Jun. 11, 2019, 13 pages.
Witten Opinion of the International Preliminary Examining Authority, Patent Application No. PCT/US2019/025850, dated Feb. 28, 2020, 5 pages.
ETRI: Data Transmission with LBT priority classes, 3GPP Draft; R1-15581-Data Transmission With LBT Priority Classes, 3rd Generation Partnership Project (3GPP), Mobile Competence Centre; 650 Route Des Lucioles; F-06921 Sophia-Antipolis Cedex; Fran, vol. RAN WG1, No. Malmo, Sweden; Oct. 5, 2015-Oct. 9, 2014 Oct. 4, 2015 (Oct. 4, 2015), XP051039758, Retrieved from the Internet: URL:http://www.3gpp.org/ftp/Meetings_3GPP_SYNC/RAN1/Docs/ [retrieved on Oct. 4, 2015], pp. 1-4.
Apple Inc.; "NR Unlicensed Considerations"; R1-1802287; 3GPP TSG RAN WG1 Meeting #92; Athens, Greece, Feb. 26-Mar. 2, 2018; five pages.

* cited by examiner

LISTEN-BEFORE-TALK PROCEDURE WITH PRIORITY AND INTERFERENCE ADDITION AWARENESS

PRIORITY CLAIM

This application claims benefit of priority of U.S. Provisional Patent Application Ser. No. 62/653,408 titled "Listen-Before-Talk Procedure with Priority and Interference Addition Awareness", filed on Apr. 5, 2018, which is hereby incorporated by reference as though fully and completely set forth herein.

FIELD OF THE INVENTION

The present application relates to wireless communications and wireless communication devices, and more particularly to Listen-Before-Talk (LBT) procedures in wireless communication devices, e.g. during LTE and/or 5G New Radio (5G-NR) communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Additionally, there exist numerous other different wireless communication technologies and standards. Some examples of wireless communication standards in addition to those mentioned above include GSM, UMTS (WCDMA, TDS-CDMA), LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, etc.

In general, wireless communication technologies, such as cellular communication technologies, are substantially designed to provide mobile communication capabilities to wireless devices. Furthermore, in addition to the communication standards mentioned above, there also exist extensions aimed at boosting transmission coverage in certain cellular networks. For example, LTE in Unlicensed spectrum (LTE-U) and NR in Unlicensed spectrum (NR-U) allows cellular carriers/service providers to boost coverage in their cellular networks by transmitting in unlicensed band(s) also used by other wireless communication technologies. In order to standardize operation of LTE and NR in the unlicensed bands, the use of a contention protocol referred to as listen-before-talk (LBT) was introduced. LBT facilitates coexistence of devices operating according to different wireless communication protocols on the same band. LBT procedures essentially allow a device to first sense its radio environment and find a network or free radio channel on which the device is allowed to operate, prior to starting wireless transmissions. Effective LBT procedures can therefore lead to more efficient use of wireless resources.

Other corresponding issues related to the prior art will become apparent to one skilled in the art after comparing such prior art with the disclosed embodiments as described herein.

SUMMARY OF THE INVENTION

Embodiments described herein relate to a User Equipment (UE) device, base station, and/or relay station, and associated method for performing enhanced Listen-before-talk (LBT) procedures during wireless communications, e.g. during Long Term Evolution (LTE) and/or 5G-NR (NR) wireless communications and transmissions. The standardization of NR, much like the standardization of LTE, covers a wide range of use-cases. Given the diversity of applications and scenarios, both LTE and NR make provisions for operating in different frequency bands, including frequency bands in the unlicensed spectrum for expanding network capacity when and where it is required. Therefore, LTE and NR designs support operation in both traditional licensed frequency spectrum bands as well as unlicensed frequency bands, operation in the latter typically referenced as LTE-U for LTE in Unlicensed spectrum, and NR-U for NR in Unlicensed spectrum, respectively. The implementation of LBT procedures in LTE and NR plays an effective role in mitigating co-existence issues that may arise when devices operate according to different wireless communication standards within the same (unlicensed) frequency bands, providing a mechanism for balancing the performance between the different wireless communication protocols. LBT has therefore emerged as a vital topic for NR-U, with the added challenge of providing enhancements to present day LBT procedures.

When considered in the context of NR, for example, different services and different types of signaling may have different real-time/quality-of-service (QoS) requirements. For example, ultra-reliable low-latency communication (URLLC) for intelligent transportation system (ITS) requires real-time data transmission, while data downloading has a certain level of tolerance for communication latency. In other words, URLLC for ITS may have QoS requirements that are not necessarily applicable to standard data download operations. Accordingly, an enhanced LBT procedure may be implemented to meet different service and signaling requirements, ultimately resulting in more efficient resource use and more reliable wireless communications.

Pursuant to the above, in some embodiments, an LBT procedure may take one or more of the following factors into consideration when determining parameters taken into consideration for assigning wireless communication resources to a device:

Priority of requested transmission;
Requested channel occupation time;
Requested frequency resource; and/or
Requested transmit power spectrum density.

The LBT procedure may be leveraged for performing bandwidth-part (BWP) switching and real time traffic management over NR-U, to name a couple of examples.

Accordingly, in some embodiments, a device, for example a UE, may perform an LBT procedure that enables efficient access to resources and balanced use of the resources by a number of different devices, for example in unlicensed frequency bands. The LBT procedure may include specifying one or more input parameter values pertaining to wireless communications that the device intends to conduct, adjusting one or more output parameter values based on the one or more input parameter values and an access history of the device, and determining whether to access at least a portion of the wireless communication resources to conduct the wireless communications, based at least on the one or more output parameter values. The one or more output parameter values pertain to wireless communication resources accessible to the device, and the access history keeps track of wireless communication resource accesses made by the device. The input parameter values may include at least those previously enumerated above, while the output parameter values may include an energy detection threshold, a contention window size, and/or extended clear channel assessment bypass.

The LBT procedure may further include adjusting the access history to indicate a lower future priority for the device if at least a portion of the wireless communication resources is assigned to the device, and adjusting the access history to indicate a higher future priority for the device if no wireless communication resources are assigned to the device as a result of the LBT procedure. Thus, when determining whether to access the wireless communication resources, the decision may be based at least on a present priority of the device indicated by the access history.

Based on the above, the device may perform the LBT procedure at a first bandwidth part (BWP) which is non-idle, access wireless communication resources in the first BWP pursuant to a second, higher priority LBT procedure, transmit BWP-switch information—using the accessed wireless communication resources in the first BWP—to switch to a second BWP that is presently idle, and communicate over wireless communication resources accessed in the second BWP pursuant to transmitting the BWP-switch information. The device may release the wireless communication resources in the first BWP immediately following transmission of the BWP-switch information. Finally, the device may specify at least some of the input parameter values to indicate a high priority request for access to the wireless communication resources accessible to the device, at the beginning of an on-duration during discontinuous reception.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
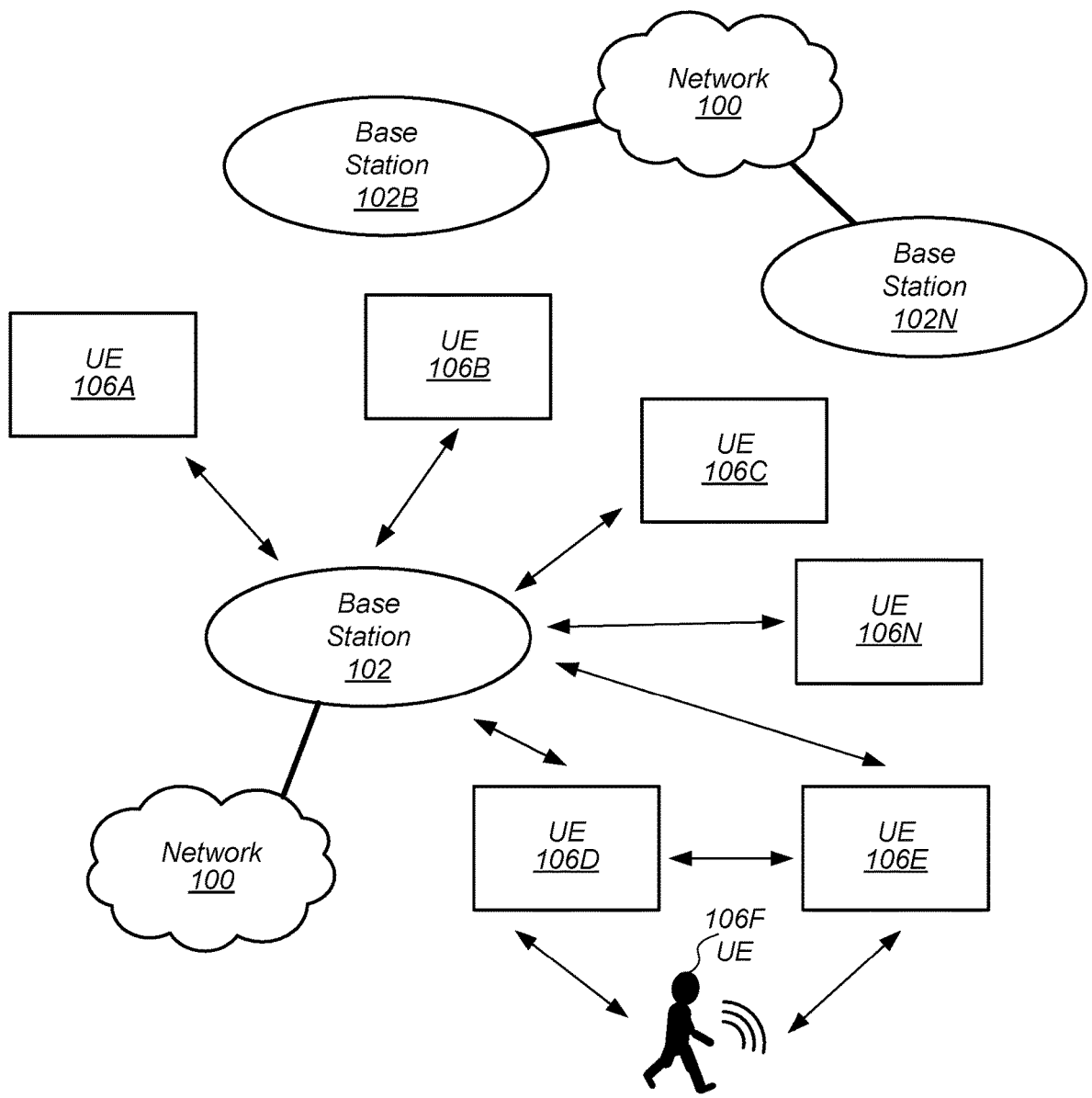
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

ACK: Acknowledge
ARQ: Automatic Repeat Request (also: Automatic Repeat Query)
BPSK: Binary Phase-Shift Keying
BS: Base Station
BWP: Bandwidth Part
C-DRX: Connected-Mode Discontinuous Reception
CCE: Control Channel Elements
CFI: Control format Indicator
COT: Channel Occupation Time
CQI: Channel Quality Indicator
CRC: Cyclic Redundancy Check
CWS: Contention Window Size
DCI: Downlink Control Information
DL: Downlink (from BS to UE)
DL-SCH: Downlink Shared Channel
DRX: Discontinuous Reception
eCCA: Extended Clear Channel Assessment
ED: Energy Detection
eNB: Evolved Node B (base station in LTE/E-UTRAN)
FDD: Frequency Division Duplexing
FEC: Forward Error Correction
gNB: next Generation Node B (base station in NR/5G-NR)
GPS: Global Positioning System
GSM: Global System for Mobile Communication
HARQ: Hybrid Automatic Repeat Request
ITS: Intelligent Transportation System
LBT: Listen Before Talk
LTE: Long Term Evolution
MAC: Media Access Control (layer)
MIMO: Multiple-In Multiple-Out
NACK: Negative Acknowledge NR: New Radio (also 5G-NR)
NW: Network
OFDM: Orthogonal Frequency-Division Multiplexing
PCFICH: Physical Control Format Indicator Channel
PDCCH: Physical Downlink Control Channel
PDSCH: Physical Downlink Shared Channel
PDU: Protocol Data Unit
PHICH: Physical HARQ Indicator Channel
PHY: Physical (Layer)
PUSCH: Physical Uplink Shared Channel
PSD: Power Spectrum Density
QoS: Quality of Service
QPSK: Quadrature Phase-Shift Keying
REG: Resource Element Group
RNTI: Radio Network Temporary Identifiers
RRC: Radio Resource Control
RSRP: Reference Signal Received Power
RSSI: Reference Signal Strength Indicator
RX: Reception
SINR: Signal-To-Interference-Plus-Noise Ratio
TB: Transport Blocks
TDD: Time Division Duplexing
TTI: Transmission Time Interval
TX: Transmission
UE: User Equipment
UL: Uplink (from UE to BS)
ULSCH: Uplink Shared Channel
UMTS: Universal Mobile Telecommunication System
URLLC: Ultra-reliable Low-Latency Communication Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—A memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—Any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—Any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

DCI—refers to downlink control information. There are various DCI formats used in PDCCH (Physical Downlink Control Channel), e.g. in LTE. The DCI format is a predefined format in which the downlink control information is packed/formed and transmitted in PDCCH.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
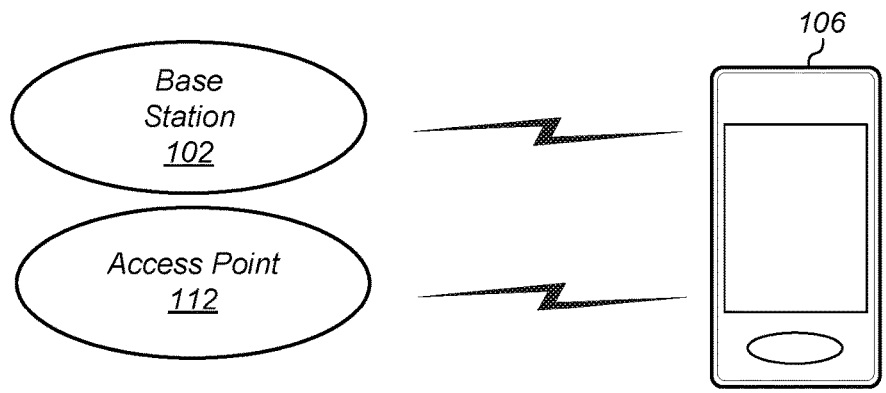
FIG. 2 illustrates an exemplary base station and an exemplary access point in communication with an exemplary wireless user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A, 106B, etc., through 106N. Each of the user devices may be referred to herein as a "user equipment" (UE) or UE device.

Thus, the user devices 106 are referred to as UEs or UE devices. Various ones of the UE devices may implement listen-before-talk (LBT) procedures according to various embodiments disclosed herein.

The base station 102 may be a base transceiver station (BTS) or cell site, and may include hardware that enables wireless communication with the UEs 106A through 106N. The base station 102 may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102 may facilitate communication between the user devices and/or between the user devices and the network 100. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1xRTT, 1xEV-DO, HRPD, eHRPD), Wi-Fi, WiMAX etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'. In some embodiments, the base station 102 (e.g. an eNB in an LTE network or a gNB in an NR network) may communicate with at least one UE or a group of UEs that perform LBT procedures according to various embodiments as disclosed herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum. Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs As mentioned above, UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). In some embodiments, the UE 106 may be configured to perform LBT procedures according to various embodiments as disclosed herein, in establishing wireless communications with base station 102. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UE 106 communicating with a network may therefore be interpreted as the UE 106 communicating with one or more network nodes considered to be a part of the network and which may interact with the UE 106 to conduct communications with the UE 106 and in some cases affect at least some of the communication parameters and/or use of communication resources of the UE 106.

Furthermore, as also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting with the vehicles represented by UEs 106D and 106E in a similar manner. Various aspects of vehicles communicating in a network exemplified in FIG. 1 are disclosed in the context of vehicle-to-everything (V2X) communications such as the communications specified by 3GPP TS 22.185 V 14.3.0, among others.

FIG. 2 illustrates an exemplary user equipment 106 (e.g., one of the devices 106-A through 106-N) in communication with the base station 102 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, e.g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include radio circuitries for communicating using either LTE or CDMA2000 1xRTT or 5G-NR (NR), and/or communicating using each of Wi-Fi and BLUETOOTH™. Other configurations are also possible.

Figure 3:
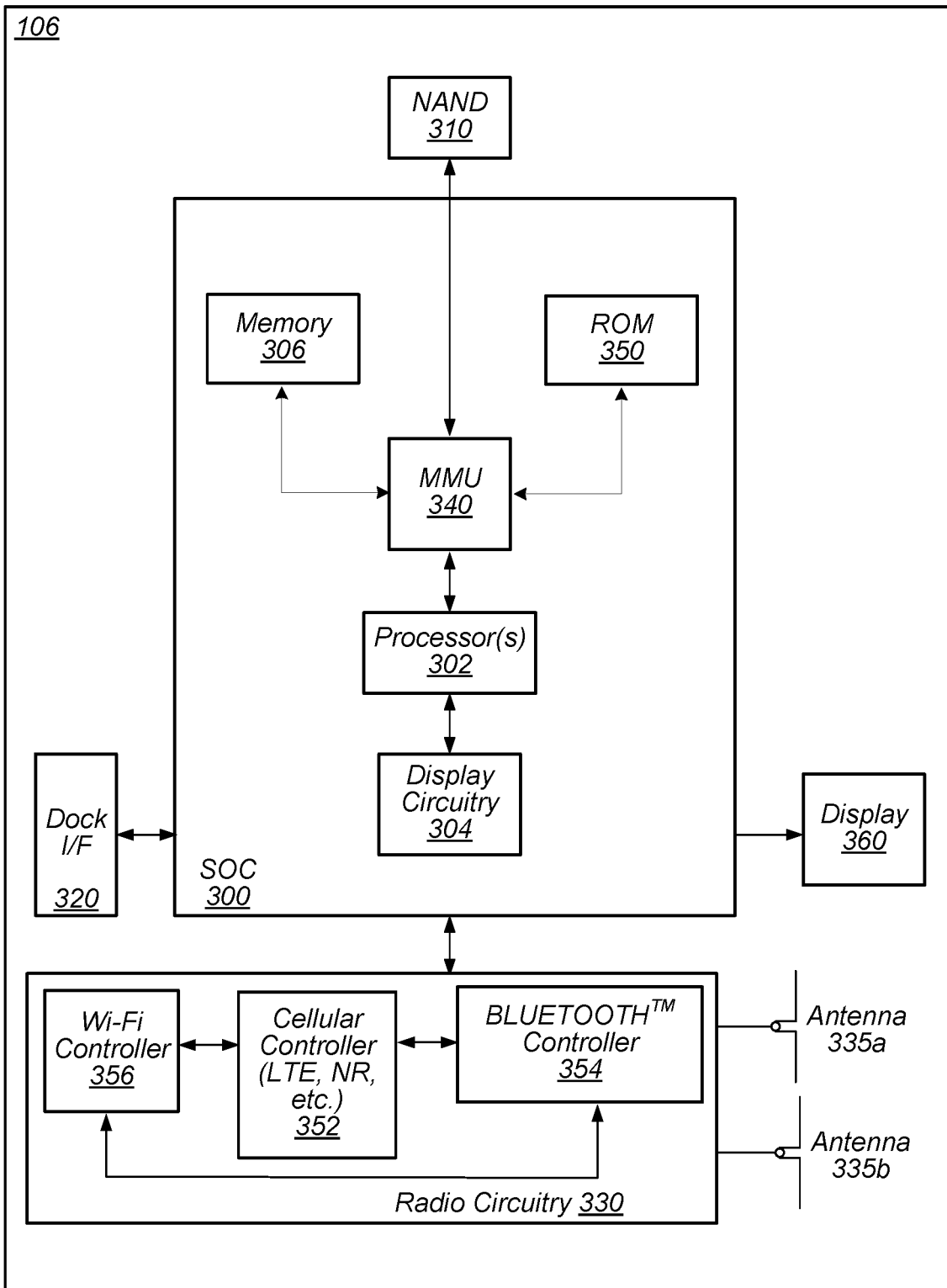
FIG. 3 illustrates an exemplary simplified block diagram of a UE, according to some embodiments.

FIG. 3—Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication or radio circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to perform LBT procedures. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that incorporate LBT procedures or LBT procedure control, according to various embodiments disclosed herein. Specifically, processor(s) 302 may be coupled to and/or may interoperate with other components as shown in FIG. 3 to facilitate UE 106 communicating in a manner that seeks to enhance LBT procedures according to the various embodiments disclosed herein. Processor(s) 302 may also implement various other applications and/or end-user applications running on UE 106. It should also be noted that processor(s) 302 may be representative of multiple processing elements, interoperable to perform any or all of various applications and end-user applications and/or to perform part or all of the methods described herein.

Figure 5:
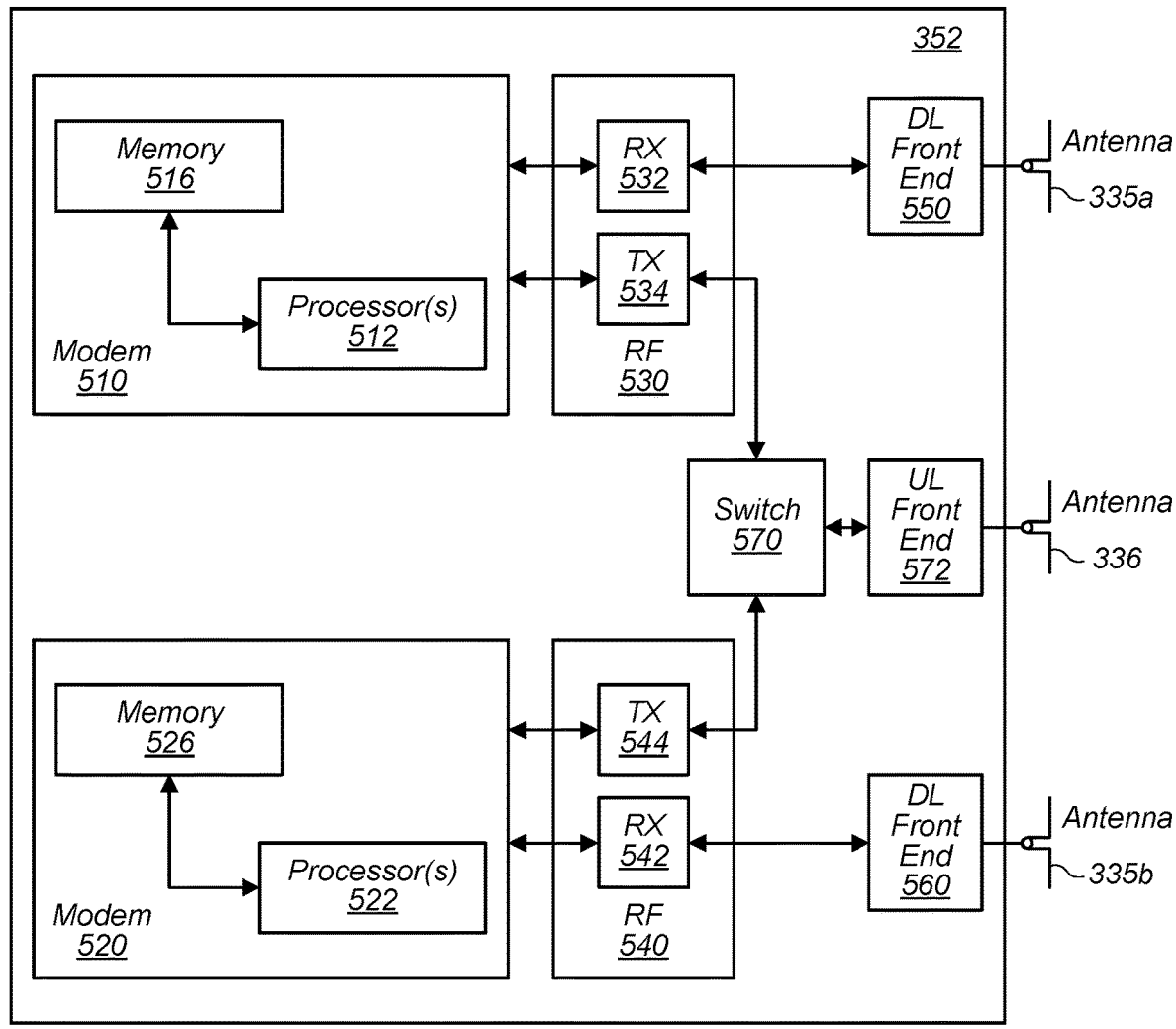
FIG. 5 shows an exemplary simplified block diagram illustrative of cellular communication circuitry, according to some embodiments.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. 3GPP LTE controller and/or 3GPP NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments may have fewer or more similar controllers for various different RATs that may be implemented in UE device 106. For example, at least one exemplary block diagram illustrative of some embodiments of cellular controller 352 is shown in FIG. 5 as will be further described later.

Figure 4:
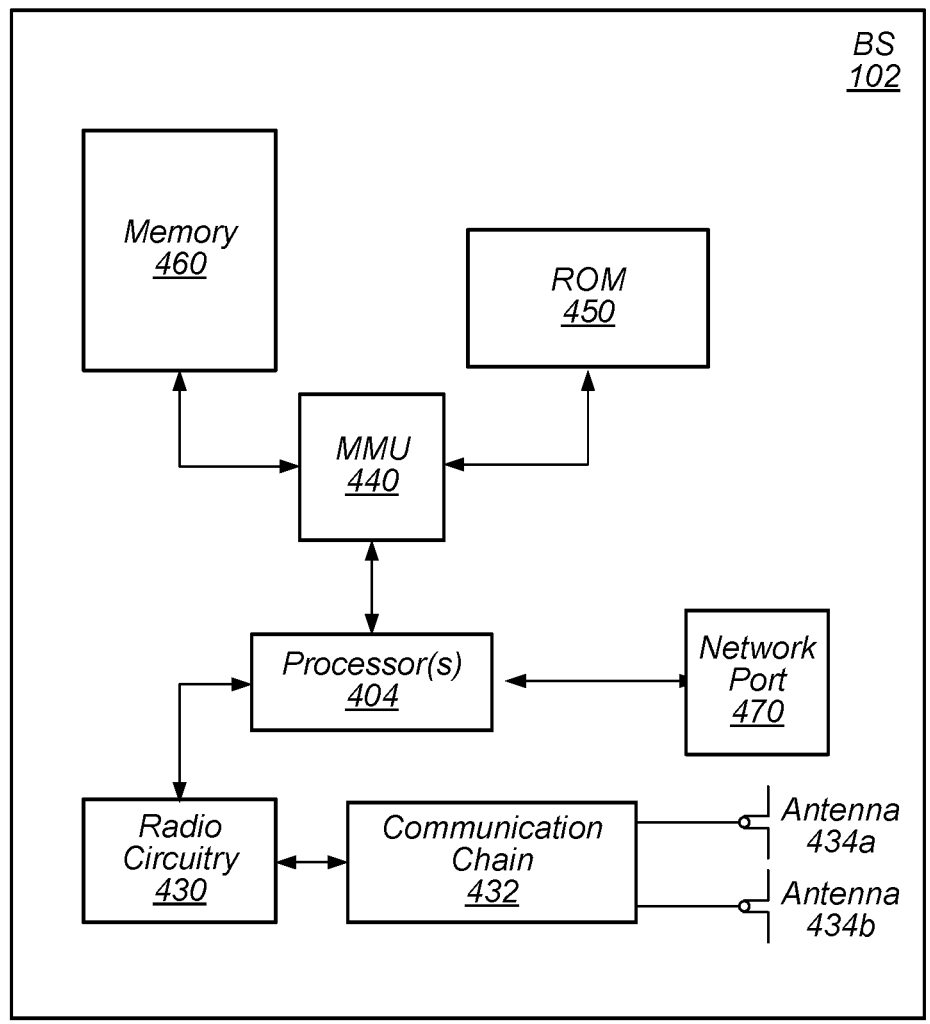
FIG. 4 illustrates an exemplary simplified block diagram of a base station, according to some embodiments.

FIG. 4—Exemplary Block Diagram of a Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434a, and possibly multiple antennas (e.g. illustrated by antennas 434a and 434b), for performing wireless communication with mobile devices and/or other devices. Antennas 434a and 434b are shown by way of example, and base station 102 may include fewer or more antennas. Overall, the one or more antennas are collectively referred to as antenna(s) 434. Antenna(s) 434 may be configured to operate as a wireless transceiver and may be further configured to communicate with UE devices 106 via radio circuitry 430. The antenna(s) 434 communicates with the radio circuitry 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (NR), WCDMA, CDMA2000, etc. The processor(s) 404 of the base station 102 may operate by executing program instructions stored on a memory medium (e.g., a non-transitory computer-readable memory medium), for base station 102 to communicate with a UE device that performs LBT procedures as disclosed herein. Alternatively, processor(s) 404 may be configured as a programmable hardware element(s), such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio circuitry 430 may be designed to communicate according to the Wi-Fi standard. Base station 102 may operate according to the various methods as disclosed herein for communicating with mobile devices capable of performing LBT procedures as disclosed herein.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

C-DRX Operating Mode

Discontinuous reception (or DRX) is an example of a power saving technique developed to save power in transceiver circuitry. In devices utilizing DRX, portions of wireless circuitry may be powered down if there is no information (e.g., packets) to be received or transmitted. The wireless circuitry may periodically be powered on to determine if there is information to be received, and subsequently powered down again if such a determination indicates that no new information is incoming. A device utilizing DRX may determine from a header in a transmitted packet if the information contained in the packet is intended for that device. If the information is not relevant to that device, then circuitry may be powered down for at least a portion of the remainder of the packet, and subsequently powered on before the next header. In addition, neighbor cell searching may be conducted during the time when the wireless circuitry is powered up while operating in a DRX mode. Neighbor cell searching may be performed in order to enable cell reselection and handover of the mobile device from one cell to another. DRX can be enabled in different network connection states, including connected mode and idle mode. In connected DRX (C-DRX) mode, the UE listens to the downlink (DL) packets following a specified pattern determined by the base station (BS). In idle DRX (I-DRX) mode, the UE listens to the page from the BS to determine if it needs to reenter the network and acquire the uplink (UL) timing.

The parameters for DRX cycles may be configured by the BS through different timers. The DRX inactivity timer indicates the time in number of consecutive subframes to wait before enabling DRX. Short DRX cycles and long DRX cycles are defined to allow the BS to adjust the DRX cycles based on the applications. A DRX short cycle timer may be defined to determine when to transition to the long DRX cycle. When there is no reception of packets for an extended period of time after the successful reception of a packet, the BS may initiate RRC connection release and the UE may enter the RRC IDLE state, during which the idle DRX can be enabled. The On-Duration timer may be used to determine the number of frames over which the UE will read the DL control channel every DRX cycle before entering power saving mode. The allowed values are 1, 2, 3, 4, 5, 6, 8, 10, 20, 30, 40, 50, 60, 80, 100, and 200. During idle DRX mode, the UE may monitor one paging occasion (PO) per DRX cycle, which is one subframe.

Figure 6:
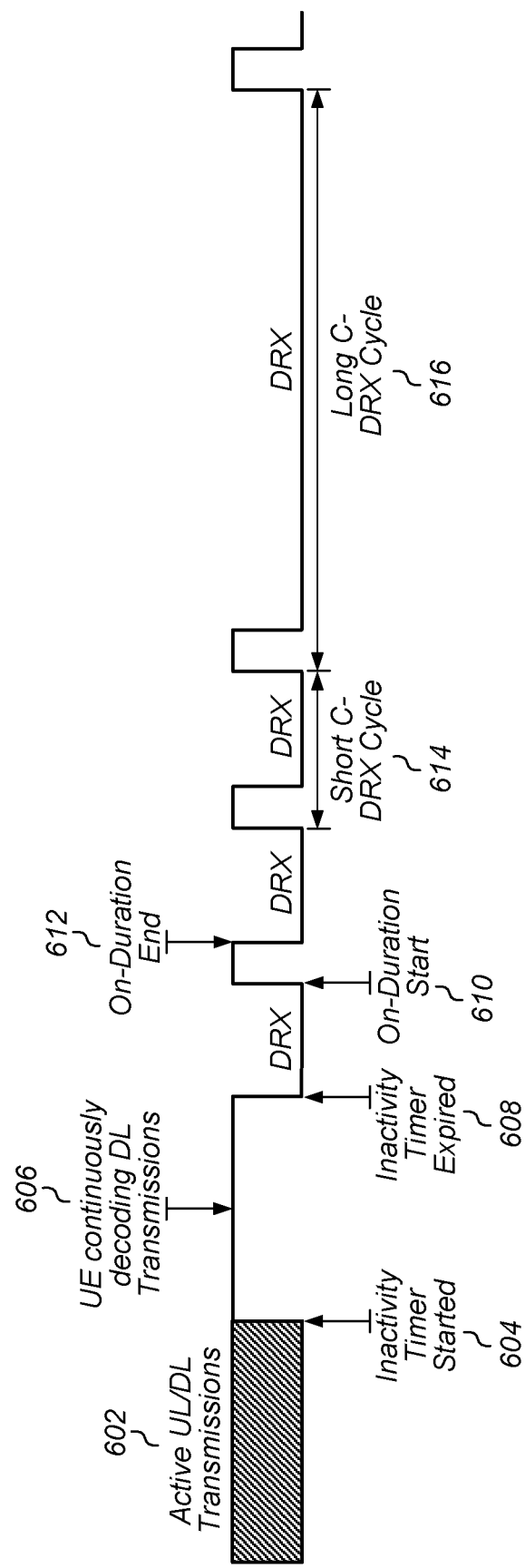
FIG. 6 shows an exemplary timing diagram illustrating general operations of a C-DRX capable UE over a period of time.

FIG. 6 illustrates various aspects of general C-DRX operation. As indicated by 602, the UE 106 may operate in an active state and may perform one or more uplink and/or downlink (UL/DL) transmissions (e.g., transmit uplink data and/or receive downlink data). At 604, an inactivity timer may be initiated. The inactivity timer may be initiated at the end of the active transmissions in 602. Note that the inactivity timer may have been initiated one or more times during the active transmissions in 602, but may have been reset each time as a result of continuing activity (transmissions) until no more activity was observed at 604, at which point it may run until expiration at 608. The inactivity timer may have any length, as desired; some examples of possible inactivity timer length might include 100 ms, 80 ms, 50 ms, 40 ms, or any other value.

In 606, between initiation (at 604) and expiration (at 608) of the inactivity timer, the UE 106 may not be performing any uplink or downlink transmissions, but may continue to operate in the active state, and may monitor one or more communication channels (e.g., a PDCCH) for downlink grants. At 608, the inactivity timer may expire. At this point the UE 106 may transition to a reduced-power state (DRX), as a result of having observed a sufficient period of data communication inactivity (e.g., as indicated by the expiration of the inactivity timer). During the period of time that the UE 106 is operating in the reduced-power state, the UE 106 may power down and/or reduce power to one or more components, such as baseband logic components and/or radio components.

At 610, the UE 106 may "wake-up" and re-enter the active state. The UE 106 may wake up at a time specified by a schedule, e.g., of which it may be informed by a base station (e.g., an eNode-B, in LTE or gNode-B in NR). At the specified time (or after a specified interval), the base station may notify the UE 106 of a downlink grant for the UE 106, if there is any downlink data pending, so the UE 106 may check (e.g., monitor a communication channel such as a PDCCH) for downlink grants during this time. One or more other functions may also be performed during this time, if desired. This time period may also be referred to as the "on-duration" in C-DRX operation. According to some embodiments, the on-duration may last a specified length of time, such as 5 ms, or 10 ms, or another length of time, e.g., as specified by the 3GPP 36.331 specification; alternatively, the on-duration may last until certain functions have been performed, and may end when no further specified functions need to be performed. At 612, the on-duration may end, and if no downlink grants were received during the on-duration, the UE 106 may go back to "sleep" and transition back into the reduced-power state. Any number of subsequent cycles of sleeping (DRX) and waking (on-duration) may be performed, as desired.

Note that the UE 106 may also be configured to transition between C-DRX cycles with different lengths. For example, as shown, the UE 106 may perform up to a pre-determined number (such as 2, 4, 8, 16, etc.) of "short C-DRX" cycles 514 (which may last 20 ms, 40 ms, 80 ms, or any other length of time), and if no uplink or downlink transmission are performed by the end of the pre-determined number of cycles, the UE 106 may perform one or more "long C-DRX" cycles 616 (which may last 80 ms, 160 ms, 320 ms, or any other length of time, e.g., as specified by 3GPP 36.331), which may specify a longer period of reduced-power state operation before waking up for active state on-duration operations. The long C-DRX cycles may continue until further active communication (e.g., which may be initiated either by the UE 106 or the network) occurs, or one or more other conditions occur which might cause the UE 106 to transition away from the long C-DRX cycles. If active communications are again initiated at some subsequent time, the UE 106 may perform similar steps (e.g., monitoring activity/inactivity via an inactivity timer and initiating one or more C-DRX cycles if sufficient inactivity is seen between active communications) if appropriate, e.g., depending on communication activity.

Listen-Before-Talk (LBT) Procedure

As previously mentioned, the standardization of NR (similar to the standardization of LTE) covers a wide range of use-cases, and, considering the diversity of possible applications and scenarios, makes provisions for operating in different frequency bands that include frequency bands in the unlicensed spectrum. The implementation of enhanced LBT procedures (e.g. in LTE and/or NR) may therefore play an effective role in improving the mitigation of co-existence issues that may affect devices operating according to different wireless communication standards/protocols within the same (unlicensed) frequency bands. Examples are provided herein with respect to LBT deployment in NR (5G-NR) systems, and specifically as implemented in UEs. However, the various systems and methods for enhanced LBT procedures disclosed herein are equally applicable to all communication systems that employ LBT or LBT procedures similar in intent and operation to LBT, and are also equally applicable on the base station side. For example, the enhanced LBT procedures disclosed herein may be implemented at both the UE and the base station side in both LTE-U and NR-U systems. For example, the enhanced LBT procedures may be implemented in eNBs and gNBs as well as UEs in LTE (LTE-U) and NR (NR-U) systems, respectively.

As previously mentioned, different services and different types of signaling may have different real-time and quality-of-service (QoS) requirements, e.g. when considered in the context of NR. As an example, ultra-reliable low-latency communication (URLLC) for intelligent transportation system (ITS) requires real-time data transmission, while simple data downloads may be characterized by a certain level of tolerance for communication latency. Therefore, an enhanced LBT procedure may facilitate finer control over resource allocation based on different service and signaling requirements, ultimately resulting in more efficient resource use and more reliable wireless communications.

Accordingly, in some embodiments, an LBT (procedure) controller may use some or all of the following input information to determine certain output parameters which may in turn be used in determining the priority according to which wireless communication resources are assigned to a device:

Priority of requested transmission;
Requested channel occupancy time;
Requested frequency resource; and/or
Requested transmit power spectrum density.

The LBT controller may be used to determine resource assignments when performing bandwidth-part (BWP) switching, real time traffic management over NR-U, and/or when performing various other applicable wireless communication tasks.

Figure 7:
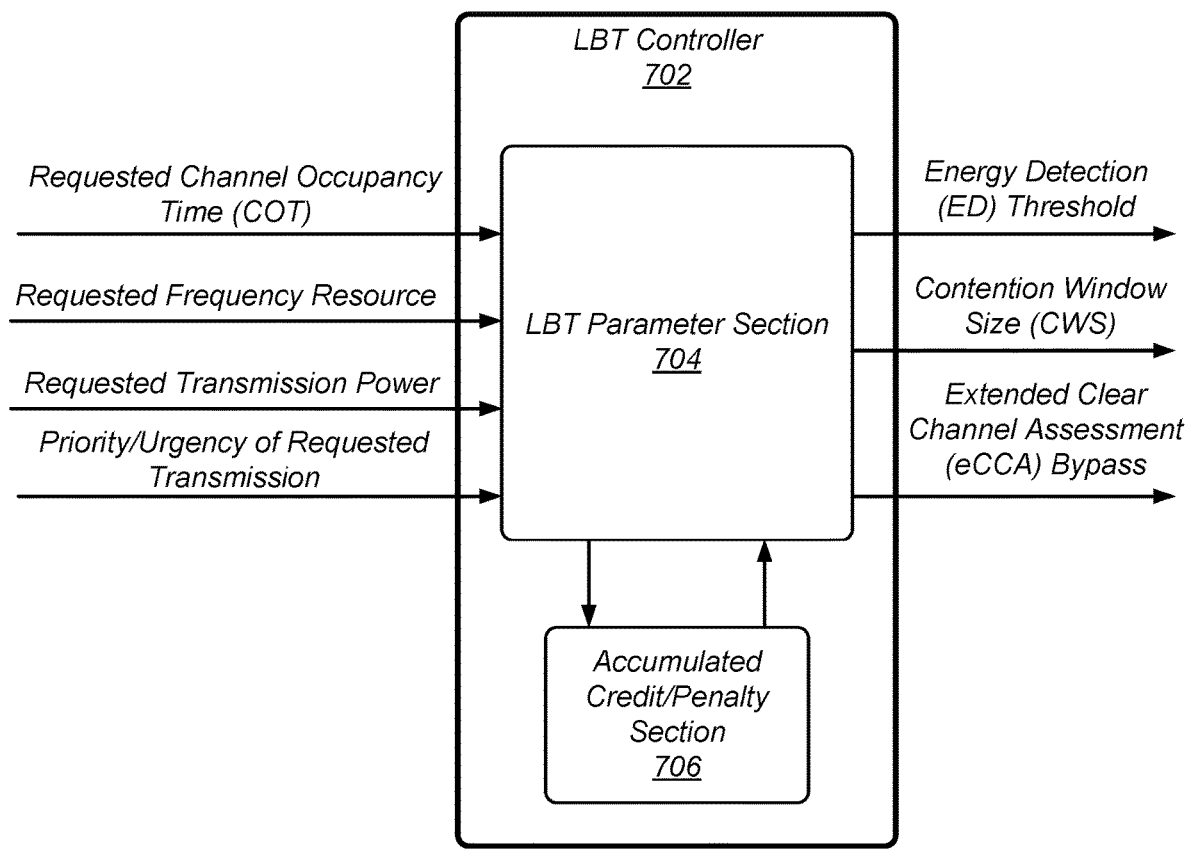
FIG. 7 shows an exemplary simplified block diagram illustrating a listen-before-talk (LBT) procedure controller, according to some embodiments.

FIG. 7 shows an exemplary block diagram illustrating an LBT procedure controller, according to some embodiments. As shown in FIG. 6, the LBT controller 702 may include an LBT parameter section 704 and an accumulated credit/penalty section (which, for the sake of simplicity, may also be referred to as an access history section) 706. LBT controller 702 may adjust several output parameters which are used to control the LBT procedure. The output parameters may include an energy detection (ED) threshold, a contention window size (CWS; a period of time in which the network is operating in contention mode), and/or extended clear channel Assessment (eCCA) bypass (where CCA refers to a determination of whether or not the medium/resource is idle, and may include carrier sensing and energy detection).

In addition, LBT controller 702 may include several inputs, or input parameters utilized to adjust the output parameters. The input parameters may include requested transmission priority or urgency of requested transmission (e.g. from a service and/or from signaling), requested channel occupancy time (COT), requested frequency resource(s), and/or requested transmission power spectrum density. It should be noted that while embodiments exemplified in FIG. 7 are shown to include certain parameters, various embodiments may introduce additional parameters or they may feature a different combination of parameters on both the input side and the output side of LBT parameter section 704, while maintaining the overall structure an operation of LBT controller 702.

The requested transmission priority (or urgency of requested transmission) parameter may be included to take into account the priority/urgency of the intended transmission during the LBT procedure. In addition, overall selection of medium (resource or frequency resource) utilization across the UEs may be guaranteed according to an access history mechanism implemented as an accumulated credit/penalty mechanism 706. In one sense, the access history mechanism 706 may be used to establish a process by which each UE is appropriately or fairly assigned resources with respect to other UEs also requesting resources. For example, a UE may request a high priority transmission, which may be granted to the UE via a smaller value for the CWS parameter, and/or a higher value for the ED threshold parameter, and/or a value of "true" for the eCCA bypass parameter. Following the granting of the resource(s) for the transmission, or the granting of the transmission, the UE may receive a debit (which may be considered a "penalty"), which results in in an indication or instruction to the UE to yield the medium (or resource(s)) to other UEs in a next round of the LBT procedure (or next round of LBT control) if other UEs are also waiting for access. The debit, or penalty mark, may be implemented in terms of correspondingly adjusted output parameter values, e.g. by adjusting the CWS to be longer, and/or adjusting the ED threshold to be lower, and/or adjusting the eCCA bypass to be "false".

The requested COT may also be taken into account during the LBT procedure or LBT control. There may be instances or scenarios in which a UE may need to have or request real-time access to the medium (or resource(s)) but only for a short period of time rather than for a relatively longer access-time period. In some embodiments, the LBT controller 702 may give such a case request a higher priority by adjusting the respective values of any one or more of the three output parameters as described above. The credit/penalty mechanism or access history mechanism 706 may also be applied with respect to granting access to the medium/resource(s) based at least on requested COT.

The requested transmission frequency resource may also be considered during the LBT procedure by LBT controller 702. There may be instances or scenarios in which the UE may require sparse utilization of the medium or resource(s), e.g. in case of a DCI transmission. Because such a short transmission (e.g. a transmission of a time duration that is shorter than a specified time duration considered as a "short time duration") over a sparse frequency resource does not produce a significant increase in interference within the medium or frequency resource(s), a request for resources for such a transmission may be given a higher priority by LBT controller 702, e.g. by setting a smaller CWS, and/or higher ED threshold, and/or by enabling eCCA bypass). The access history (or credit/penalty) mechanism 706 may again be applied to ensure fairness, e.g. balanced access to the resource(s) across all UEs.

The requested transmission power spectrum density (PSD) may also be used as an input parameter by LBT controller 702. Since lower transmission PSD does not produce a significant increase in interference within the medium or frequency resource(s), the requested transmission PSD may be used by the LBT controller 702 to control the priority of access to the medium/resource(s) by the UE.

Use of Enhanced LBT Controller for Bandwidth Part Switching

A carrier bandwidth part (BWP) is a contiguous set of physical resource blocks selected from a contiguous subset of the common resource blocks for a given numerology on a given carrier. For downlink, the UE may be configured with up to several (e.g. four) carrier BWPs, with only one carrier BWP active at a given time. For uplink, the UE may similarly be configured with up to several (e.g. four) carrier BWPs, with only one carrier BWP active at a given time. If a UE is configured with a supplementary uplink, then the UE may be additionally configured with up to four carrier BWPs in the supplementary uplink, with only one carrier BWP active at a given time.

Figure 8:
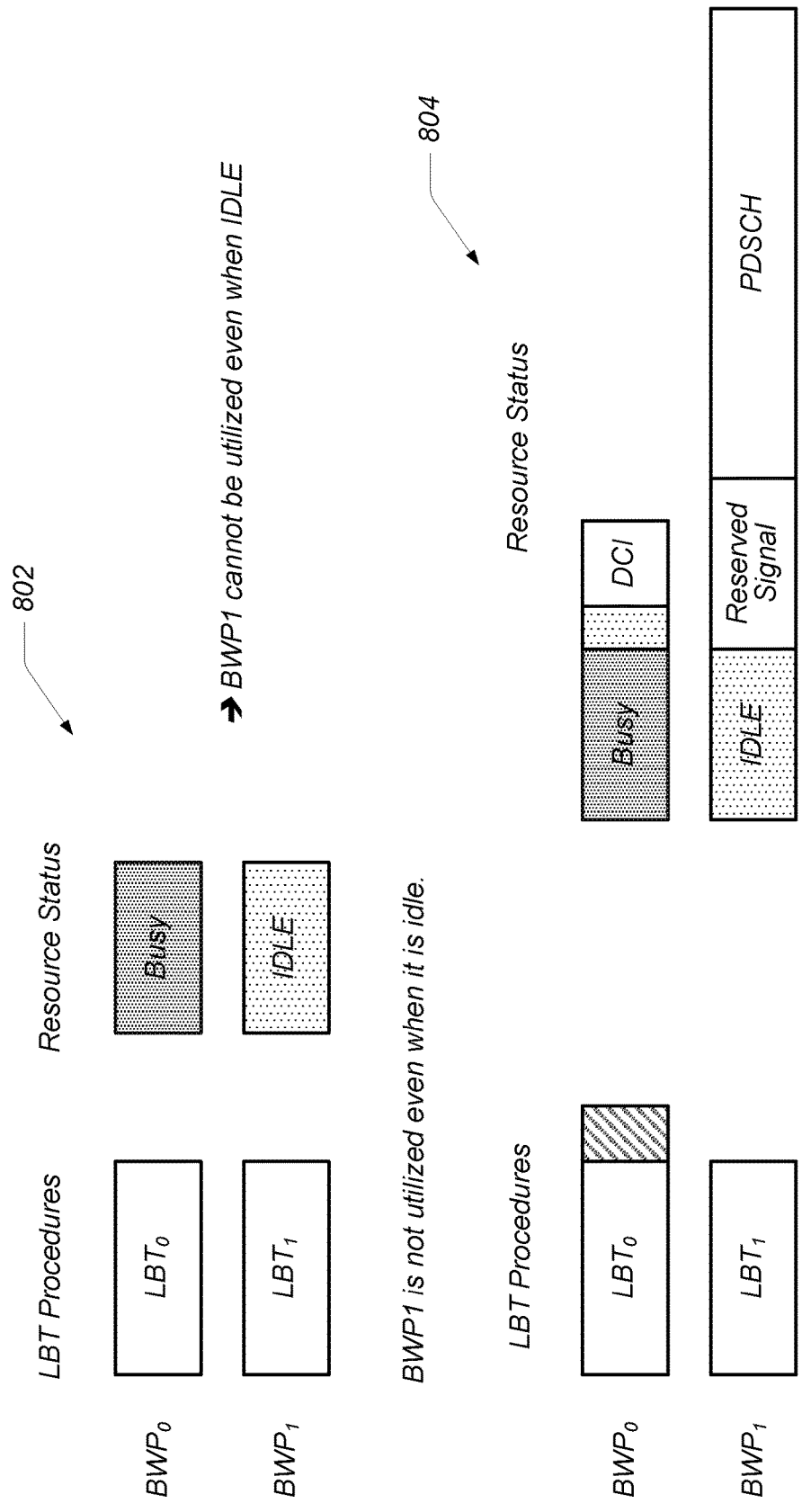
FIG. 8 shows an exemplary diagram illustrating the use of an LBT procedure for resource utilization with bandwidth-part (BWP) switching, according to some embodiments.

FIG. 8 shows an exemplary diagram illustrating the use of LBT controller 702 for resource utilization/provisioning/assignment for bandwidth-part (BWP) switching, according to some embodiments. Without loss of generality, in the example illustrated in FIG. 8, the UE is configured with two BWPs, with a currently active BWP indicated as $BWP_0$. The UE may perform an LBT procedure for each BWP, indicated as $LBT_0$ for $BWP_0$, and $LBT_1$ for $BWP_1$, respectively. As indicated in 802, according to current (prior art) LBT procedures, if a medium (or resource) is busy (or utilized) at $BWP_0$ while it is idle at $BWP_1$, a base station (e.g. gNB) cannot utilize $BWP_1$ if there is no available licensed band. It should also be noted that even if a licensed band were available, the available licensed band would need to have the capability and speed to switch the active BWP from $BWP_0$ to $BWP_1$, which is likely the case for LTE NR-U deployment with LTE as the licensed band.

LBT controller 702 may be used, however, to facilitate BWP switching for transmitting DCI. As mentioned above, DCI transmission represents a case in which the UE requires sparse utilization of the medium or resource(s), that is, the UE needs the resource(s) for a transmission having a time duration that is shorter than a specified time duration considered to be a "short time duration". Because such a transmission does not result in a significant increase in interference within the resource(s), it may be given a higher priority. Thus, if the currently utilized medium or resource(s) is (are) busy at $BWP_0$ while it (they) is (are) idle at $BWP_1$, the UE may start a second, higher priority LBT procedure for $BWP_0$ with a specific set of input or input parameter value requests provided to LBT controller 702. For example, in this scenario, the following input parameter requests may be provided to LBT controller 702: sparse frequency resource (e.g. requested frequency resource is of a size smaller than a specified size/threshold), short COT (e.g. a COT shorter than a specified COT), and/or urgency of transmission (e.g. the transmission is indicated to be urgent). In this manner, after the higher priority LBT is performed, the medium may be accessed at $BWP_0$ as indicated in 804. Once the UE obtains the medium/resource(s) in $BWP_0$, the UE may transmit a BWP-switch DCI, which only requires use of sparse frequency resource(s) for a short time period over $BWP_0$, as indicated by the input parameters during the preceding LBT procedures. The UE may release the medium/resource(s) in $BWP_0$ immediately after transmission of the BWP-switch DCI transmission. Once the BWP-switch DCI has been successfully transmitted over $BWP_0$, the UE may begin communications with other devices using $BWP_1$ resource(s).

Use of Enhanced LBT Controller for Managing Real-Time Traffic over NR-U

Figure 9:
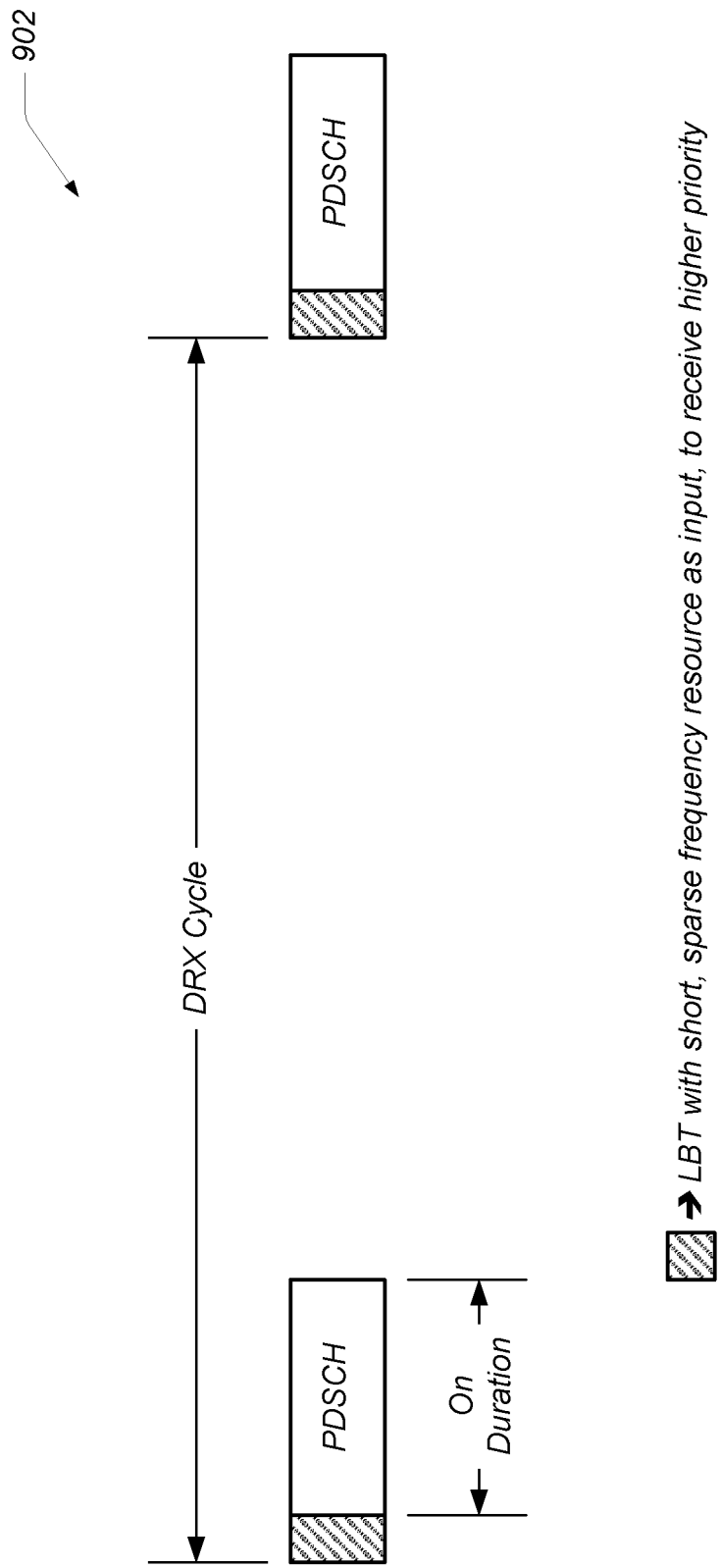
FIG. 9 shows an exemplary timeline diagram illustrating the use of an LBT procedure for managing real-time data traffic over NR-U, according to some embodiments.

Another example of wireless communications that may benefit from the use of LBT controller 702 involves short and periodic real-time transmissions (e.g. voice or intelligent traffic system). FIG. 9 shows an exemplary timeline diagram illustrating the use of LBT controller 702 for managing real-time data traffic over NR-U, according to some embodiments. As the traffic on-duration time approaches, the UE may provide the following inputs to LBT controller 702: shorter COT (e.g. a COT shorter than a specified COT), high priority/urgency of requested transmission (e.g. the transmission is indicated as having high priority), and sparse usage of frequency resource(s) (e.g. the requested frequency resource(s) is of a size smaller than a specified size). In this manner, the access bar to the medium/resource(s) may be lowered, providing a greater opportunity for delivering real-time traffic over NR-U. Again, because such data traffic has a low utilization of the medium/resources, the penalty is diminished during the DRX cycle such that the UE may again request higher priority access of the medium/resource(s) for the next on-duration period, as illustrated in FIG. 9.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processor configured to cause a device to perform a listen-before-talk (LBT) procedure, which includes the processor causing the device to:
specify one or more input parameter values pertaining to intended wireless communications of the device;
adjust one or more output parameter values based on the one or more input parameter values and an access history of the device, wherein the one or more output parameter values pertain to wireless communication resources accessible to the device, and wherein the access history indicates wireless communication resource accesses previously made by the device; and
determine whether to access at least a portion of the wireless communication resources to conduct the intended wireless communications, based at least on the one or more output parameter values.

2. The apparatus of claim 1, wherein the one or more input parameter values comprise one or more of:
requested channel occupancy time;
requested frequency resource;
requested transmission power; or
priority and/or urgency of requested transmission.

3. The apparatus of claim 1, wherein the one or more output parameter values comprise one or more of:
energy detection threshold;
contention window size; or
extended clear channel assessment bypass.

4. The apparatus of claim 1, wherein the processor is configured to further cause the device to:
when performing the LBT procedure:
adjust the access history to indicate a lower future priority for the device if the at least a portion of the wireless communication resources is accessed by the device; and
adjust the access history to indicate a higher future priority for the device if the at least a portion of the wireless communication resources is not accessed by the device;
wherein determining whether to access the at least a portion of the wireless communication resources includes determining whether to access the at least a portion of the wireless communication resources based at least on a present priority of the device indicated by the access history.

5. The apparatus of claim 1, wherein the wireless communication resources accessible to the device are part of an unlicensed frequency band.

6. The apparatus of claim 1, wherein the processor is configured to further cause the device to:
perform a second LBT procedure at a first bandwidth part (BWP) that is currently active, wherein the second LBT procedure indicates a higher priority request for access than that indicated by the LBT procedure;
access wireless communication resources in the first BWP pursuant to the second LBT procedure;
transmit BWP-switch information using the accessed wireless communication resources in the first BWP, wherein the BWP-switch information is transmitted to switch to a second BWP that is currently idle; and
communicate over wireless communication resources accessed in the second BWP pursuant to transmitting the BWP-switch information.

7. The apparatus of claim 6, wherein the processor is configured to further cause the device to:

release the wireless communication resources in the first BWP immediately following transmission of the BWP-switch information.

8. The apparatus of claim 1, wherein the processor is configured to further cause the device to:
specify at least some of the one or more input parameter values to indicate a high priority request for access to the wireless communication resources accessible to the device, at a beginning of an on-duration during discontinuous reception.

9. A device comprising:
radio circuitry configured to facilitate wireless communications of the device; and
a processor communicatively coupled to the radio circuitry and configured to perform a listen-before-talk (LBT) procedure, wherein as part of the LBT procedure the processor is configured to:
specify one or more input parameter values pertaining to intended wireless communications of the device;
adjust one or more output parameter values based on the one or more input parameter values and an access history of the device, wherein the one or more output parameter values pertain to wireless communication resources accessible to the device, and wherein the access history indicates wireless communication resource accesses previously made by the device; and
determine whether to access at least a portion of the wireless communication resources to conduct the intended wireless communications, based at least on the one or more output parameter values.

10. The device of claim 9, wherein the one or more input parameter values comprise one or more of:
requested channel occupancy time;
requested frequency resource;
requested transmission power; or
priority and/or urgency of requested transmission.

11. The device of claim 9, wherein the one or more output parameter values comprise one or more of:
energy detection threshold;
contention window size; or
extended clear channel assessment bypass.

12. The device of claim 9, wherein the processor is further configured to:
when performing the LBT procedure:
adjust the access history to indicate a lower future priority for the device if the at least a portion of the wireless communication resources is accessed by the device; and
adjust the access history to indicate a higher future priority for the device if the at least a portion of the wireless communication resources is not accessed by the device;
wherein determining whether to access the at least a portion of the wireless communication resources includes determining whether to access the at least a portion of the wireless communication resources based at least on a present priority of the device indicated by the access history.

13. The device of claim 9, wherein the wireless communication resources accessible to the device are part of an unlicensed frequency band.

14. The device of claim 9, wherein the processor is configured to further cause the device to:
perform a second LBT procedure at a first bandwidth part (BWP) that is currently active, wherein the second LBT procedure indicates a higher priority request for access than that indicated by the LBT procedure;
access wireless communication resources in the first BWP pursuant to the second LBT procedure;
transmit BWP-switch information using the accessed wireless communication resources in the first BWP, wherein the BWP-switch information is transmitted to switch to a second BWP that is currently idle; and
communicate over wireless communication resources accessed in the second BWP pursuant to transmitting the BWP-switch information.

15. The device of claim 14, wherein the processor is configured to further cause the device to:
release the wireless communication resources in the first BWP immediately following transmission of the BWP-switch information.

16. The device of claim 9, wherein the processor is configured to further cause the device to:
specify at least some of the one or more input parameter values to indicate a high priority request for access to the wireless communication resources accessible to the device, at a beginning of an on-duration during discontinuous reception.

17. A non-transitory memory element storing instructions executable by a processor to cause a device to:
perform a listen-before-talk (LBT) procedure, wherein as part of the LBT procedure the instructions are executable by the processor to cause the device to:
specify one or more input parameter values pertaining to intended wireless communications of the device;
adjust one or more output parameter values based on the one or more input parameter values and an access history of the device, wherein the one or more output parameter values pertain to wireless communication resources accessible to the device, and wherein the access history indicates wireless communication resource accesses previously made by the device; and
determine whether to access at least a portion of the wireless communication resources to conduct the intended wireless communications, based at least on the one or more output parameter values.

18. The non-transitory memory element of claim 17, wherein the instructions are executable by the processor to further cause the device to:
when performing the LBT procedure:
adjust the access history to indicate a lower future priority for the device if the at least a portion of the wireless communication resources is accessed by the device; and
adjust the access history to indicate a higher future priority for the device if the at least a portion of the wireless communication resources is not accessed by the device;
wherein determining whether to access the at least a portion of the wireless communication resources includes determining whether to access the at least a portion of the wireless communication resources based at least on a present priority of the device indicated by the access history.

19. The non-transitory memory element of claim 17, wherein the instructions are executable by the processor to further cause the device to:
perform a second LBT procedure at a first bandwidth part (BWP) that is currently active, wherein the second LBT procedure indicates a higher priority request for access than that indicated by the LBT procedure;

access wireless communication resources in the first BWP pursuant to the second LBT procedure;

transmit BWP-switch information using the accessed wireless communication resources in the first BWP, wherein the BWP-switch information is transmitted to switch to a second BWP that is currently idle; and communicate over wireless communication resources accessed in the second BWP pursuant to transmitting the BWP-switch information.

20. The non-transitory memory element of claim 19, wherein the instructions are executable by the processor to further cause the device to:

release the wireless communication resources in the first BWP immediately following transmission of the BWP-switch information.

* * * * *